United States Patent [19]

Noland

[11] 4,097,254

[45] Jun. 27, 1978

[54] BAGHOUSE WITH DOUBLE PASS TRAVELING PURGE HEAD

[76] Inventor: Richard D. Noland, 1900 W. 47th Pl., Suite 308, Shawnee Mission, Kans. 66205

[21] Appl. No.: 806,188

[22] Filed: Jun. 13, 1977

[51] Int. Cl.$^2$ ............................................. B01D 46/04
[52] U.S. Cl. ........................................ 55/294; 55/302; 55/341 MC
[58] Field of Search ................ 55/284, 283, 286, 287, 55/294, 295, 299, 302, 341 MC

[56] References Cited

U.S. PATENT DOCUMENTS

| | | | |
|---|---|---|---|
| 3,018,503 | 1/1962 | Hijiya et al. | 55/294 |
| 3,482,378 | 12/1969 | Noland | 55/294 |

FOREIGN PATENT DOCUMENTS

| | | | |
|---|---|---|---|
| 2,009,625 | 2/1970 | France | 55/294 |
| 2,405,344 | 8/1975 | Germany | 55/294 |
| 1,010,337 | 11/1965 | United Kingdom | 55/302 |

*Primary Examiner*—Frank W. Lutter
*Assistant Examiner*—David L. Lacey
*Attorney, Agent, or Firm*—Lowe, Kokjer, Kircher, Wharton & Bowman

[57] ABSTRACT

A cleaning purge head for a baghouse traveling centrally of the clean air plenum to isolate and back flush with high pressure air successive compartments of filter bags arranged in two parallel banks of filters. Through a depressible seal, the purge head communicates with a pressure chamber supplying cleaning air. A cam activated valve regulates the bursts of cleaning air supplied to successive filter bag compartments as a delivery conduit registers therewith such that the purge head alternates in cleaning the two banks of filters on successive passes through the baghouse.

10 Claims, 9 Drawing Figures

BAGHOUSE WITH DOUBLE PASS TRAVELING PURGE HEAD

BACKGROUND AND SUMMARY OF THE INVENTION

This invention relates to dust control equipment and, more particularly, to a compartmentalized baghouse equipped with a traveling purge head to successively isolate and clean compartments of filter bags.

Continuous emphasis on environmental quality has resulted in increasingly strenuous regulatory controls on industrial emissions. One technique which has proven highly efficient in controlling air pollution has been the separation of undesirable particulate matter from a gas stream by fabric filtration.

Such filtration is carried out in dust collection equipment known in the trade as a "baghouse" which operates on the same general principle as an ordinary household vacuum cleaner, except on a much larger scale. Basically, the baghouse includes a sheet metal housing divided into two chambers, referred to as plenums, by a tube sheet having a plurality of vertically suspended fabric tubes or bags in which cylindrical wire cages are inserted for skeletal support. A particle-laden gas stream, induced by the action of a fan, flows into the lower chamber (dirty air plenum) wherein dust accumulates on the cloth bags as the gas passes through the fabric into the upper chamber (clean air plenum) and out the exhaust. Continuous operation of the unit causes a cake of dust to build up on the outside of the bags which, unless removed, will reduce and eventually stop the flow of gas through the filters.

Several methods have been devised to remove the dust cake from the bags. One cleaning technique to which this invention particularly relates provides for a cleaning or purge head which reciprocally travels the length of the baghouse at the side thereof while successively isolating sections of the clean air plenum and causing relatively high pressure air to back flush through the isolated section, thereby disloging the dust cake from the filter bags. My earlier U.S. Pat. No. 3,482,378 issued Dec. 9, 1969 and entitled "Traveling Purge Head Dust Filter" discloses a baghouse possessing such characteristics. In the aforementioned patent, a plurality of baffles divide the clean air plenum into successive sections, each communicating with an exhaust duct. For each section so defined, filtered gas normally flows through the bags and into the clean air compartment thereabove and out the common exhaust. The purge head traveling along the side of the clean air plenum periodically and successively covers the mouth of each compartment and discharges high pressure air therein to clean the filter bags associated with that particular compartment.

The adaptability of these principles to baghouses of increasing size is somewhat limited. It is not always physically feasible, much less economically practical, to simply build a larger and longer baghouse in order to achieve increased capacity. Floor space within the plant poses a constraint on the baghouse dimensions. Furthermore, a larger baghouse would require, a priori, enlarged support facilities such as the cleaning system which represents a significant capital investment and increases operational costs. Accordingly, there is a need in the industry for adapting the beneficial qualities of a traveling purge head to baghouses of a much larger capacity than those heretofore employing this cleaning technique while at the same time minimizing the investment and operational costs occasioned by the cleaning system. The primary object of this invention is to fulfill this need.

More specifically, an object of the invention is to provide a baghouse with a traveling purge head to function centrally of the clean air plenum as opposed to traveling along the side of the clean air plenum as has been the practice with equipment of this type.

In conjunction with the foregoing object, it is equally important to provide a baghouse of increased capacity without a corresponding increase in the size of the purge air system. Significant investment and operational savings are realized by employing a purge air system virtually half as large as that which would be necessary for prior art designs wherein the purge head delivers its bursts of cleaning air from one side of the baghouse.

A myriad of problems are presented however, in contemplating the change of location of the purge head from operating alongside the clean air plenum to operating centrally of the clean air plenum. Provision must of course be made to provide a high pressure cleaning air source to the purge head. Furthermore, provision must be made for a valve mechanism to not only control the intermittent purging of successive compartments of the clean air plenum, but also to control the direction of the cleaning pulse whether it is to the right or the left of the direction of travel of the purge head.

Consequently, a further object of this invention is to provide a valve mechanism for a traveling purge head to intermittently control the flow of high pressure air to an isolated compartment of the clean air plenum, and to also control the direction of the cleaning discharge as the purge head moves centrally through the clean air plenum. A corollary object is to provide a valve mechanism of the character described which is simple in construction and economical in manufacture. Ease of maintenance is also a significant feature of the valve.

Yet another object of the invention is to provide a high pressure air conduit centrally of the clean air plenum wherein the traveling purge head is in communication with the pressure duct and is equipped with unique seal means to permit movement of the purge head along the pressure duct while at the same time continuously supplying pressurized cleaning air to the purge head.

Other and further objects of the invention, together with the features of novelty appurtenant thereto, will appear in the course of the following description of the drawings.

DESCRIPTION OF THE DRAWINGS

In the accompanying drawings, which form a part of the specification and are to be read in conjunction therewith, and in which like reference numerals are employed to indicate like parts in the various views.

Figure 1:
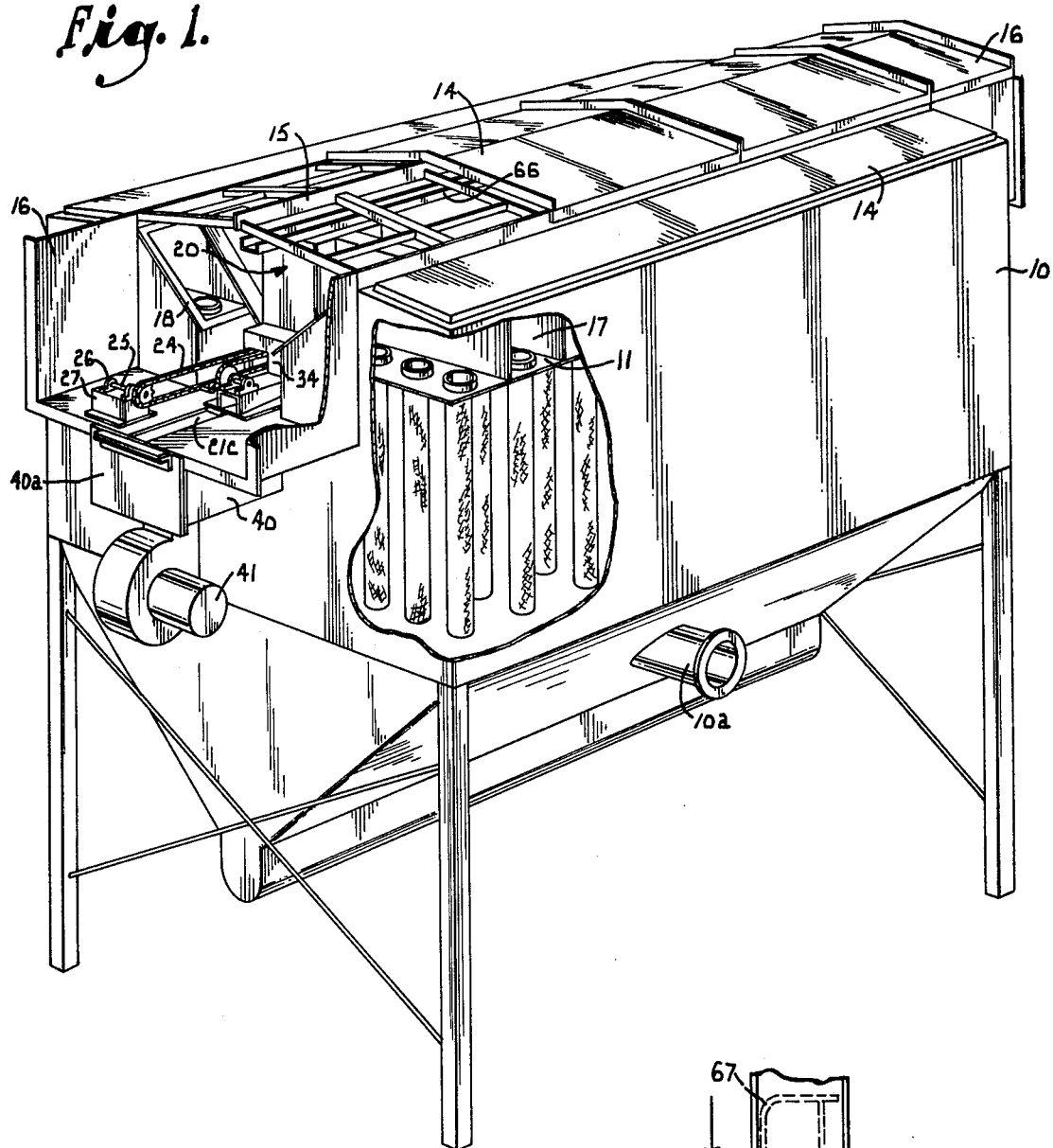
FIG. 1 is a perspective view of a baghouse constructed in accordance with a preferred embodiment of the invention with parts thereof broken away to better illustrate the details of construction.

Referring to the drawings in greater detail, the baghouse generally comprises a sheet metal housing 10 interiorly divided by horizontally mounted tube sheets 11. A plurality of filter bags 12, each containing a cylindrical cage 13 for skeletal support, are received within holes in the tube sheets 11. Employing standard terminology, the region of the housing in which the filter bags 12 are suspended is referred to as the dirty air plenum and is fitted with a process gas inlet port 10a, while the region of the housing above the mouths of the filter bags 12 is referred to as the clean air plenum. The roof of the baghouse comprises a plurality of removable access panels 14 supported on a strut network 15. The ends of the clean air plenum may be conventionally flanged with ductwork 16 used to discharge clean air or connected to a prime mover fan (not shown) for drawing process gas through the baghouse.

The lower section of the housing is characteristically hopper-shaped to receive dust cake dislodged from the bags during the cleaning operation. In the bottom of the hopper may be located an auger or other suitable equipment for removal of the collected dust cake.

Figure 2:
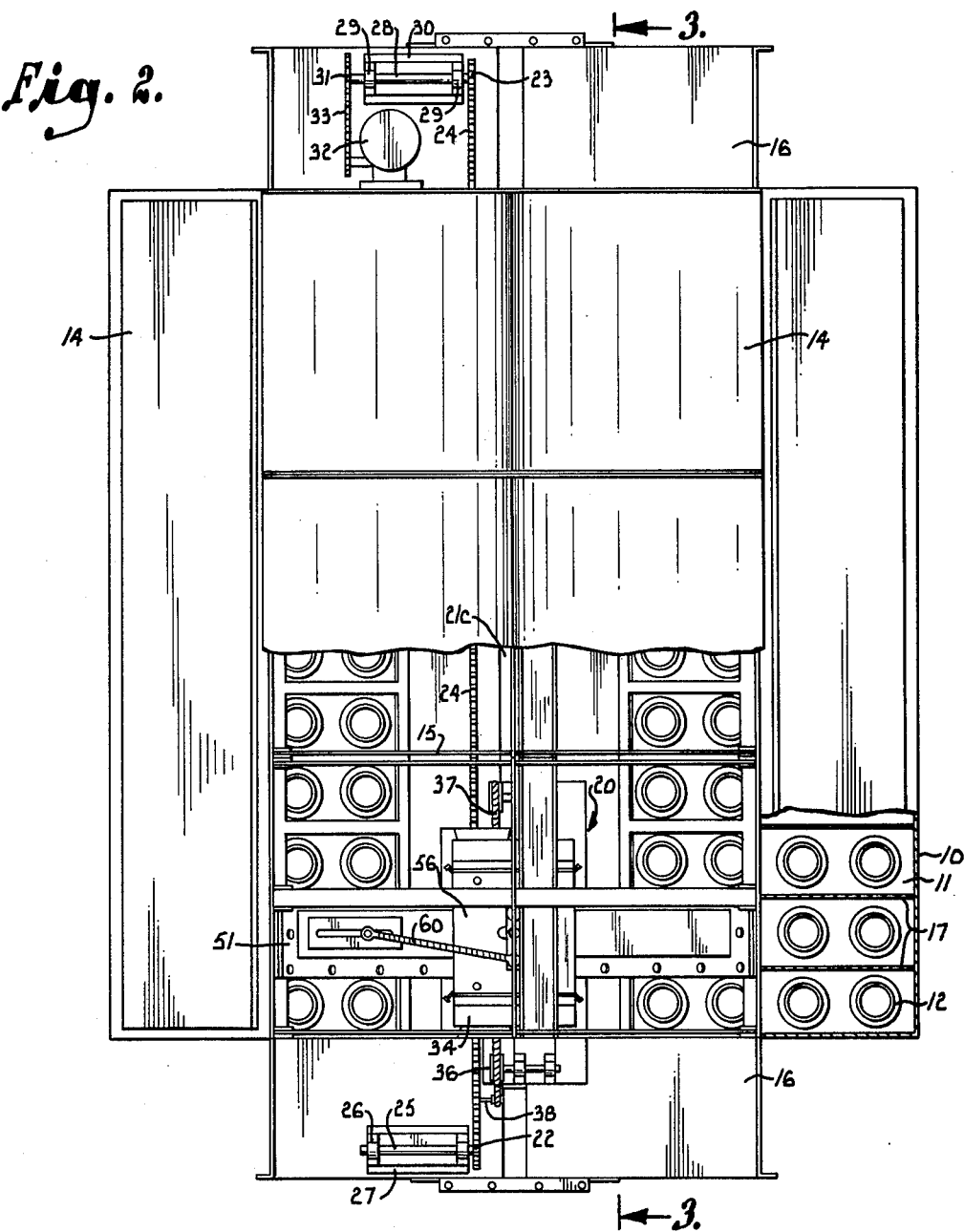
FIG. 2 is a top plan view of the baghouse with portions of the top access door broken away to illustrate the construction of the clean air plenum.

As shown in FIG. 2, the filter bags 12 are arranged in two longitudinal banks with the center of the clean air plenum being void of filtration function. Each bank of tubes is sectioned by vertical baffles 17 which extend between the tube sheet 11 and top access panels 14 and the side wall of the housing 10 to create a plurality of plenum compartments above each bank of filter tubes. The flanged mouth 18 of each compartment opens to the central portion of the clean air plenum and slopes outwardly from bottom to top.

Centrally disposed in the clean air plenum is a purge head to be later described in greater detail, being generally designated by the numeral 20. The purge head 20 rides in a trough 21 defined by a floor panel 21a and side walls 21b running longitudinally and centrally through the baghouse. At opposite ends of the trough 21 are mounted sprockets 22 and 23 around which is engaged a continuous drive chain 24. The sprocket 22 at one end of the chain 24 is carried on a rotatable shaft 25 received by pillow blocks 26 mounted on a support pad 27 and secured to the ductwork 16 at the end of one bank of tubes. Likewise, at the opposite end of the chain 24 as illustrated in FIG. 2, the sprocket wheel 23 is carried on a rotatable shaft 28 received by pillow blocks 29 on an underlying support pad 30. The opposite end of the shaft 28 is fitted with a suitable drive sprocket 31 coupled to a motor 32 by a continuous chain 33. Operation of the motor 32 thus causes continuous rotation of the drive chain 24 engaged around the sprockets 22 and 23 as indicated.

Figure 8:
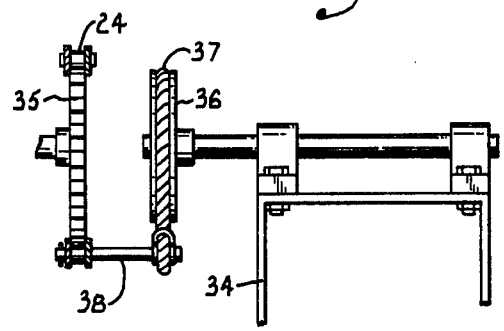
FIG. 8 is an enlarged end view, partly fragmentary, showing a portion of the drive assembly taken along line 8—8 of FIG. 3 in the direction of the arrows.

The purge head 20 includes a box-like carriage 34 having a longitudinal opening 34a through which passes the drive chain 24 which rides on idler sprocket 35 mounted on one side wall of the opening 34a. Mounted at opposite ends of the carriage are sheaves 36 around which is engaged a continuous chain or cable 37. As best shown in FIG. 8 the carriage cable 37 is coupled to the drive chain 24 by means of a pin 38 which causes the drive chain 24 to pull the purge head 20, via the carriage cable 37, through the center of the clean air plenum with the open bottom of the carriage 34 sliding on the floor panel 21a of the trough 21.

Figure 3:
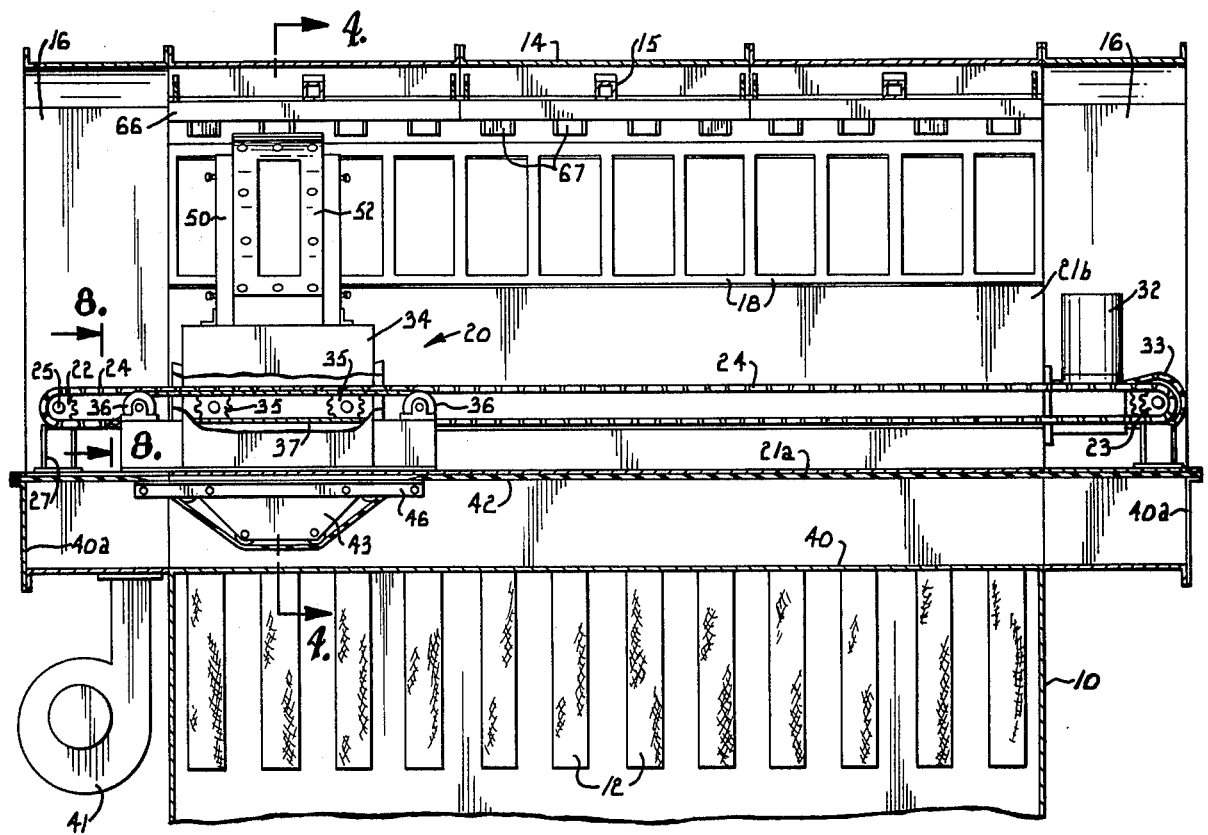
FIG. 3 is a side elevational view taken along line 3—3 of FIG. 2 in the direction of the arrows.
Figure 4:
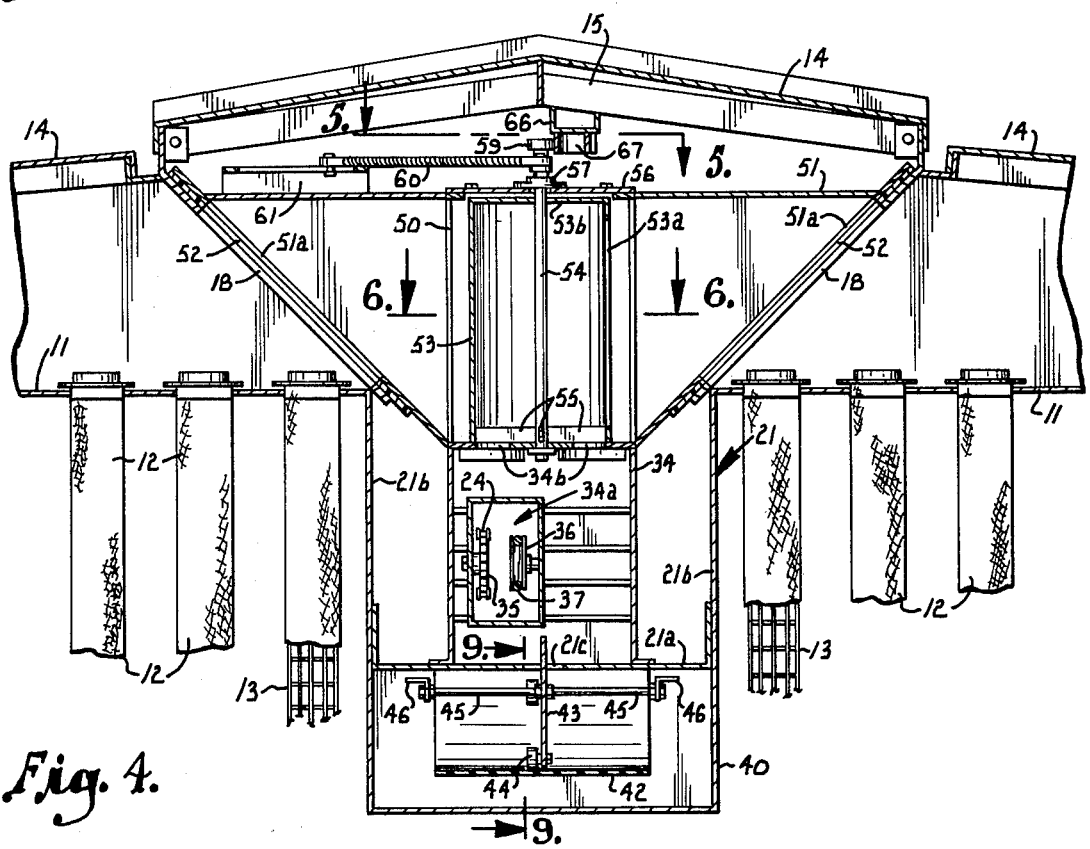
FIG. 4 is an end elevational view taken along line 4—4 of FIG. 3 in the direction of the arrows.

Underlying the central trough 21 of the clean air plenum is a pressure conduit 40 as shown in FIGS. 3 and 4 which extends the length of the baghouse. One end of the conduit is fitted with a blower 41 for supplying high pressure cleaning air. The floor panel 21a of the trough separating the trough 21 from the pressure conduit 40 includes an elongate slot 21c therethrough to provide communication with the pressure conduit 40. At the opposite ends of the conduit 40 is secured a flexible belt 42 at the upper end of the end closure panels 40a. When compressed air is supplied to the chamber 40, the belt 42 billows up to seal the elongate slot 21c as shown in the various views.

Figure 9:
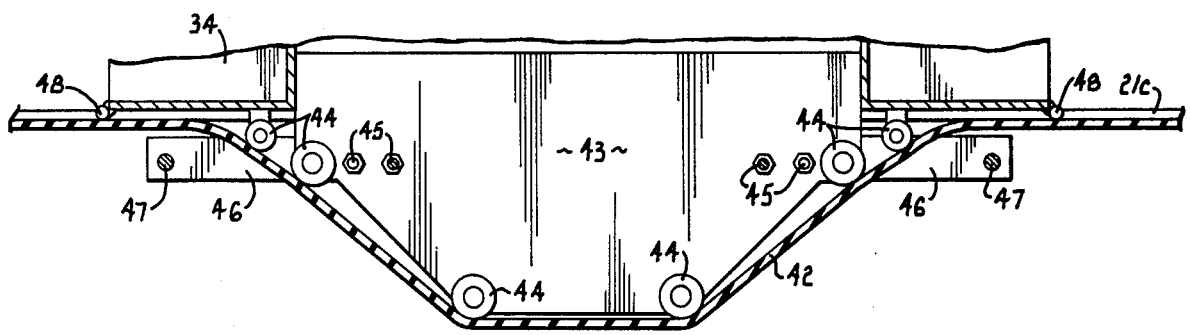
FIG. 9 is an enlarged elevational view, partly fragmentary, of the lower portion of the cleaning head taken along line 9—9 of FIG. 4 in the direction of the arrows.

As best illustrated in FIGS. 3, 4 and 9, a vertical fin 43 is secured to the bottom of the carriage and penetrates the slot in the floor panel of the trough 21. Within the pressure conduit 40, the end edges of the fin taper inwardly and mounted along the periphery of the fin are a plurality of rollers 44 which engage the flexible belt 42. Secured to the fin 43 and projecting outwardly therefrom a distance at least equal to half the width of the flexible belt 42 are a plurality of support rods 45. On the outer ends of the rods 45 are a pair of angles 46 spaced apart slightly greater than the width of the flexible belt 42 to underlie the floor panel 21a. Secured to the outer ends of the angles 46 are a pair of retaining rods 47 over which is passed the flexible belt 42. Thus, when the conduit 40 is not pressurized with cleaning air, the retaining rods 47 prevent the belt from falling away from the contour of the fin 43. It should be apparent at this point that the structure thusfar described, when the pressure conduit 40 is supplied with positive air pressure, admits air flow through the elongate slot 21c only adjacent the vertical fin as it depresses the belt 42 away from the slot 21c, while the belt creates a seal over the rest of the slot 21c.

Secured to the outer ends of the carriage 34 are stub rods 48 substantially the same size as the width of the slot 21c to keep the carriage in tracking alignment with the slot.

Mounted atop the carriage 34 is a substantially square valve housing 50. Secured to each side of the housing 50 and projecting outwardly toward each bank of filter tubes is an air delivery conduit 51 having an inclined flanged mouth 51a to complementarily mate with the mouths 18 of the compartments. The mouth 51a of each conduit 51 is trimmed with a seal plate 52 to slidingly seal against the mouth 18 of each compartment.

Figure 5:
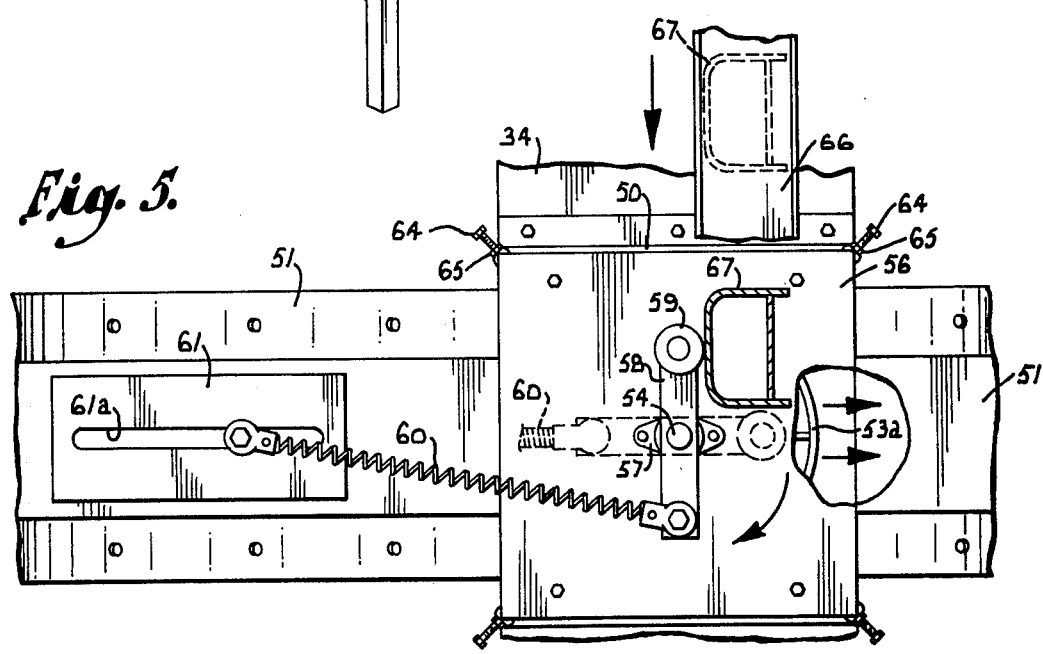
FIG. 5 is an enlarged top plan view of the cleaning head valve taken along line 5—5 of FIG. 4 in the direction of the arrows.

Within the valve housing 50 is received a cylindrical valve 53 having an open bottom which swivels on the top plate of the carriage housing 34, having holes 34b therethrough to establish communication between the interior chamber of the carriage and the interior of the valve. The valve 53 also includes an elongate vertical slot 53a in the cylindrical surface thereof. A vertical axle 54 extends centrally through the valve 53 being secured at the lower end thereof to cross braces 55 from the cylindrical valve wall and being secured at the upper end to the top circular plate 53b of the valve. The lower end of the axle 54 projects from the cross braces 55 notably through the top plate of the carriage 34. At its upper end, the axle 54 extends from the top of the valve 53 through an opening in the mounting plate 56 bolted to the top plate of the valve housing 50 and which carries a bearing 57 to rotatably receive the axle 54. As best illustrated in FIG. 5, a cross bar 58 is pinned intermediate the ends thereof to the valve axle 54. One end of the cross bar is equipped with a cam roller 59 and the opposite end is connected to a tension spring 60. The opposite end of the tension spring 60 is adjustably held in the slot 61a of a bracket 61 secured to the top of one of the delivery conduits 51 projecting from the side of the valve housing 50. The spring tension is so adjusted as to maintain the valve 53 in a position where the cross member 58 is in alignment with the spring 60 as shown in the broken line view of FIG. 5.

Figure 6:
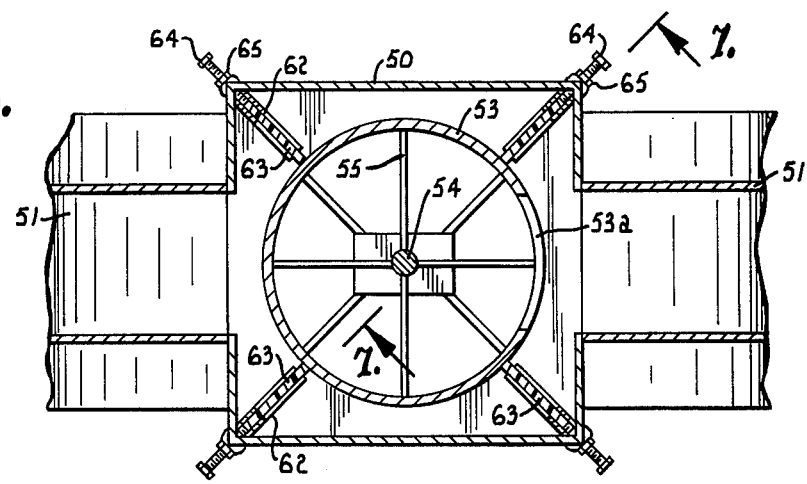
FIG. 6 is an enlarged sectional plan view taken through the cleaning head valve along line 6—6 of FIG. 4 in the direction of the arrows.
Figure 7:
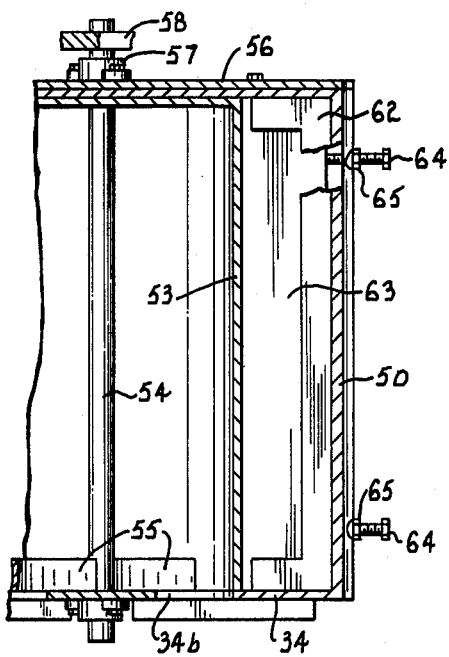
FIG. 7 is a fragmentary elevational view taken along line 7—7 of FIG. 6 in the direction of the arrows.

As best shown in FIGS. 6 and 7, each corner of the valve housing 50 is fitted with an upright channel assembly 62. Each channel assembly 62 holds a sealing strip 63 which is biased to engagement with the cylindrical surface of the valve 53 by means of adjustable lugs 64 which penetrate the corners of the housing 50 and are received by threadable nuts 65 secured to the housing 50.

Secured centrally of the clean air plenum to the roof supporting strut network 15 is a cam track 66 having mounted thereon a plurality of cam lobes 67. The lobes 67 are located at a sufficient height to strike the cam roller 59 on the cross member 58 of the valve 53 as the purge head 20 travels the length of the baghouse.

In operation, the baghouse constructed in accordance with the foregoing principles functions in the following manner. Process gas laden with particulate matter, induced by a fan either upstream or downstream of the baghouse, flows through the inlet port 10a into the dirty air plenum. The gas then passes through the filter bags 12 leaving the particulate matter deposited thereon and flows upwardly through the center of the cages 13 supporting the bags 12 to the plurality of compartments in the clean air plenum. The clean gas then flows out of the mouths 18 of the compartments into the central region of the clean air plenum and out the exhaust ductwork 16.

Operation of the drive chain 24, coupled to the carriage 34 by the connecting pin 38 attached to the carriage cable 37 pulls the purge head 20 through the clean air plenum. At the end of the tube banks, further progress of the purge head 20 is halted while the connecting pin 38 travels from the leading end of the carriage 34 around the drive sprocket 22 or 23 to the opposite end of the carriage 34, such movement of the connecting pin 38 being accomplished by rotation of the carriage cable 37 upon the carriage sheaves 36. When the connecting pin 38 reaches the far end of the carriage 34, the purge head 20 is then pulled in the opposite direction by the drive chain 24.

As the purge head 20 travels through the clean air plenum, operation of the cleaning air supply blower 41 causes the flexible belt 42 to seal against the elongate slot 21c in the floor 21a of the trough. As previously indicated, the vertical fin 43 depresses the flexible belt 42 beneath the carriage 34 and admits compressed air into the interior chamber of the carriage 34 and upwardly into the cylindrical valve 53 through ports 34b.

As the purge head 20 moves along, the flexible belt 42 disposed under the vertical fin 43 is simply depressed by the plurality of roller members 44.

As the purge head 20 is traveling between compartments, the discharge slot 53a in the cylindrical valve 53 is oriented along the longitudinal axis of the baghouse. The position of the cross bar 58, controlling rotation of the cylindrical valve 53 is as shown in the broken line view of FIG. 5. When, on the other hand, the air delivery conduit 51 registers with the mouth 18 of a compartment, the cam roller 59 on the cross bar 58 strikes a cam lobe 67 causing elongate slot 53a of the valve 53 to rotate 90° to orient with the delivery conduit 51. Thus, one compartment registering with the purge head 20 is momentarily isolated while cleaning air is discharged to the compartment. The cleaning air flows down through the bags 12 associated with that compartment causing them to billow and dislodge particulate matter collected on the bags 12. The dislodged particulate matter then falls into the hopper-shaped bottom of the dirty air plenum for removal in conventional manner. As the purge head 20 passes the cleaned compartment, the cam roller 59 disengages the cam lobe 67 and the tension spring 60 causes the valve 53 to snap back to a closed position to shut off air flow to a delivery conduit 51, until the purge head 20 registers with the next successive compartment where the previously described action is repeated. Thus, one complete bank of tubes 12 is successively cleaned compartment after compartment. Upon reaching the end of the bank of tubes, the purge head 20 reverses and travels in the opposite direction. On this subsequent pass through the clean air plenum, the cam roller 59 strikes the cam lobes 67 from the opposite direction causing the valve 53 to rotate 90° from the closed position to clean the second bank of tubes. The action of the valve 53 is thus reversed on each subsequent pass of the purge head 20 through the clean air plenum so that the baghouse experiences a complete cleaning cycle of all bags with the up and down travel of the purge head 20.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for separating particulate matter from a gas stream, said apparatus comprising:
   a housing;
   a substantially horizontal partition disposed interiorally of said housing, thereby defining a first chamber above said partition and a second chamber beneath said partition, said partition having a plurality of openings therethrough;
   an inlet conduit connected to said second chamber for directing a particulate laden gas stream into said second chamber;

an outlet conduit communicating with said first chamber to exhaust gas therefrom;

a plurality of filters disposed in said second chamber and having open ends secured to said openings through said partition, said filters being arranged in two parallel, spaced apart banks;

a plurality of vertical dividers arranged in said first chamber above said two banks of filters to thereby define compartments having mouths opening centrally of said first chamber;

a movable cleaning head disposed within said first chamber between said banks of filters and having an air delivery conduit adapted to matingly register with and seal against said compartment mouths;

drive means coupled to said cleaning head to move said head longitudinally forward and backward within said first chamber between said banks of filters;

pressurized air supply means connected to said cleaning head to supply pressurized cleaning air thereto;

valve means mounted on said cleaning head to normally restrict flow of cleaning air from said delivery conduit and intermittently operable to transmit a burst of cleaning air through said delivery conduit; and can discharge control means positioned and arranged with respect to said valve means to cause said valve means to transmit a burst of cleaning air through said delivery conduit each time said delivery conduit aligns with a compartment mouth of one bank of filters as said cleaning head travels through said first chamber in one direction and to cause said valve means to transmit a burst of cleaning air through said delivery conduit each time said delivery conduit aligns with a compartment mouth of the second bank of filters as said cleaning head travels through said first chamber in the opposite direction.

2. The apparatus as in claim 1, said drive means comprising:

a pair of sprockets mounted within said first chamber at opposite ends of said filter banks;

an endless drive chain engaging said sprockets;

power means coupled to one said sprocket to continuously drive said endless drive chain around said sprockets; and reverse motion coupling means mounted on said cleaning head and connected to said endless drive chain to reciprocally move said cleaning head longitudinally forward and backward within said first chamber between said banks of filters.

3. The apparatus as in claim 2, said reverse motion coupling means comprising:

a pair of sheaves mounted on said cleaning head;

an endless flexible loop engaging said sheaves in parallel, but spaced apart relationship to said endless drive chain; and a coupler linking said flexible loop to said drive chain; whereby said drive chain, acting through said loop and coupler, pulls said cleaning head in one direction to the end of said filter banks where said cleaning head momentarily stops as said coupler travels with said drive chain around one sprocket and said loop travels around said sheaves until said coupler travels approximately one half the length of said loop where said drive chain pulls said cleaning head in the opposite direction between said filter banks.

4. The apparatus as in claim 1, said pressurized air supply means comprising:

a conduit disposed between said filter banks and having an elongate slot communicating with said first chamber;

blower means connected to said conduit to supply cleaning air thereto; and a flexible belt mounted within said conduit in alignment with said slot to mate with and seal said slot when said blower means supplies cleaning air to said conduit;

and said cleaning head including a belt depressing member penetrating said slot to hold said flexible belt adjacent said cleaning head away from sealing engagement with said slot to admit cleaning air to said cleaning head.

5. The apparatus as in claim 4, said cleaning head further including belt retaining members connected to said depressing member to hold said flexible belt in contact with said depressing member when said blower means fails to supply cleaning air to said conduit.

6. The apparatus as in claim 4 including rollers mounted on said belt depressing member to rollably engage said flexible belt as said cleaning head travels between said filter banks.

7. The apparatus as in claim 1, said valve means comprising:

a valve housing mounted on said cleaning head and connected to said air delivery conduit;

a cylindrical valve body disposed within said valve housing for pivotal movement therein and having one closed end and one substantially open end communicating with the pressurized cleaning air supplied to said cleaning head and further having a discharge disposed through the cylindrical valve body; and said can discharge control means normally biasing said valve body to a closed position to restrict air flow to said air delivery conduit, but operable to rotate said valve body within said valve housing to register said discharge with said air delivery conduit and to admit cleaning air thereto when said delivery conduit aligns with a compartment mouth during travel of said cleaning head between said filter banks.

8. The apparatus as in claim 7, said valve means further including a plurality of elongate sealing strips adjustably mounted within said valve housing to bear against said cylindrical valve body.

9. The apparatus as in claim 7, said can discharge control means comprising:

a cam follower connected to said valve body to control the rotative position thereof and normally biasing said valve body to a closed position;

a plurality of cam lobes mounted within said first chamber to contact said cam follower during movement of said cleaning head through said first chamber and to cause said valve body to rotate to register said discharge with said air delivery conduit when said conduit aligns with a compartment mouth.

10. The apparatus as in claim 9 including adjustable tensioning positioned and arranged with respect to with said cam follower to bias said valve body to a closed position when said cam follower does not contact one of said cam lobes.

* * * * *

UNITED STATES PATENT AND TRADEMARK OFFICE
CERTIFICATE OF CORRECTION

PATENT NO. : 4,097,254
DATED : June 27, 1978
INVENTOR(S) : Richard D. Noland

It is certified that error appears in the above—identified patent and that said Letters Patent are hereby corrected as shown below:

Claim 1, column 7, line 27 change "can" to read --cam--.

Claim 7, column 8, line 38 change "can" to read --cam--.

Claim 9, column 8, line 51 change "can" to read --cam--.

Claim 10, column 8, line 64 after "tensioning" add --means--.

Claim 10, column 8, line 64 delete the second "with".

Signed and Sealed this

Fifth Day of December 1978

[SEAL]

Attest:

RUTH C. MASON
Attesting Officer

DONALD W. BANNER
Commissioner of Patents and Trademarks